(12) United States Patent
Lieu et al.

(10) Patent No.: US 6,628,508 B2
(45) Date of Patent: Sep. 30, 2003

(54) PORTABLE TERMINAL WITH FOLDABLE KEYBOARD

(75) Inventors: Winston Hong Lieu, Holmdel, NJ (US); Howard X. Wu, Holmdel, NJ (US); Youngmihn Kim, Holmdel, NJ (US)

(73) Assignee: Mobicom Corporation, Holmdel, NJ (US)

( * ) Notice: Subject to any disclaimer, the term of this patent is extended or adjusted under 35 U.S.C. 154(b) by 0 days.

(21) Appl. No.: 10/161,831

(22) Filed: Jun. 4, 2002

(65) Prior Publication Data

US 2003/0156381 A1 Aug. 21, 2003

Related U.S. Application Data

(60) Provisional application No. 60/359,199, filed on Feb. 21, 2002, and provisional application No. 60/359,200, filed on Feb. 21, 2002.

(51) Int. Cl.⁷ ................................................. G06F 1/16
(52) U.S. Cl. ................... 361/680; 361/681; 361/683; 345/905; D14/396; 400/682; 455/556
(58) Field of Search ................... 361/680, 681, 361/683; 345/905, 168, 169; 400/489, 682; 455/556, 403, 557, 553; D14/396, 320

(56) References Cited

U.S. PATENT DOCUMENTS

| 3,940,758 | A | * | 2/1976 | Margolin ..................... 361/681 |
| 5,128,662 | A | * | 7/1992 | Failla ......................... 361/681 |
| 5,278,779 | A | | 1/1994 | Conway |
| 5,712,760 | A | * | 1/1998 | Coulon et al. .............. 361/680 |
| 5,797,089 | A | * | 8/1998 | Nguyen ...................... 455/557 |
| 5,808,862 | A | * | 9/1998 | Robbins ..................... 361/681 |
| 6,081,207 | A | | 6/2000 | Batio |
| 6,088,220 | A | * | 7/2000 | Katz .......................... 361/680 |
| 6,266,234 | B1 | | 7/2001 | Leman |
| D448,032 | S | * | 9/2001 | Talley ....................... D14/396 |
| 6,370,018 | B1 | | 4/2002 | Miller |
| 6,392,870 | B1 | | 5/2002 | Miller |
| 6,483,445 | B1 | * | 11/2002 | England ..................... 361/681 |

* cited by examiner

Primary Examiner—Lisa Lea-Edmonds
(74) Attorney, Agent, or Firm—Demont & Breyer, LLC (57) ABSTRACT

A portable terminal having personal computing capability and wireless telecommunications capability. The portable terminal includes a display that is integral with, or otherwise attached to, a display. A housing is rotatably-coupled to the base and/or display. The portable terminal can be closed, wherein the housing overlies the base, or open, wherein base and housing flank the display. The display is fully visible to a user whether the portable terminal is open or closed. When open, a keyboard having keys that are apportioned between the housing and the base is accessible.

12 Claims, 6 Drawing Sheets

PORTABLE TERMINAL WITH FOLDABLE KEYBOARD

STATEMENT OF RELATED CASES

This case claims priority of U.S. Provisional Patent Applications 60/359,199 and 60/359,200, both of which were filed on Feb. 21, 2002 and both of which are incorporated by reference herein.

FIELD OF THE INVENTION

The present invention relates to wireless telecommunications in general, and, more particularly, to a hand-held processor having wireless communications capabilities.

BACKGROUND OF THE INVENTION

Hand-held processors, which are commonly called Personal Digital Assistants ("PDAs"), are becoming increasingly popular. PDAs possess relatively limited information processing, storage and retrieval capabilities. With these limited capabilities, a PDA performs specific tasks, such as functioning as an electronic diary, phone book, personal database, memo taker, calculator, alarm clock, etc. A user inputs data directly into a PDA using a stylus or a reduced-size keyboard. Additionally, PDAs are generally capable of exchanging information with a desktop computer, either by a physical connection or an infrared transceiver. PDAs typically include a relatively large display (i.e., large relative to the overall size of the PDA) and several buttons or keys for accessing specific applications and for scrolling to view information. Some PDAs also include a reduced-size keyboard.

Lately, wireless telecommunications capabilities have been incorporated into PDAs. Doing so provides advanced functions such as transmitting, receiving and displaying text messages. It also relieves a user of having to transport both a PDA and a wireless terminal (e.g., cellular telephone, pager, etc.).

Currently, most of the combined PDA/wireless terminals have one or more shortcomings that relate, among other areas of deficit, to compromised ergonomics or "user-friendliness" relative to a dedicated PDA or a dedicated wireless terminal. For example, some combined PDA/wireless terminals have hinged keyboards that rotate from a closed position to an open position for use. In some of these devices, the telecommunications capabilities can be accessed whether the keyboard is in the open or the closed position. While this arrangement provides a convenience for the user, it causes problems related to the usability of the display and the keys.

SUMMARY OF THE INVENTION

The present invention is a combined PDA/wireless terminal (hereinafter a "portable terminal") that avoids some of the shortcomings of combined PDA/wireless terminals in the prior art.

A portable terminal in accordance with the illustrative embodiment of the present invention includes a display that is integral with, or otherwise attached to a base. A housing is rotatably-coupled to the base and/or display. The portable terminal can be closed, wherein the housing overlies the base, or open, wherein the housing and the base flank the display. The portable terminal is opened by rotating the housing out-of-plane of the base. The display is fully visible to a user whether the portable terminal is open or closed.

The telecommunications capabilities of the portable terminal can be accessed when the portable terminal is closed and when it is open. Most of the PDA capabilities of the portable terminal are accessed when the portable terminal is open, wherein a keyboard having keys that are apportioned between the housing and the base is accessible.

DETAILED DESCRIPTION

This Detailed Description begins with a relatively high-level description of the functionality of various circuitry/components (hereinafter collectively "components") that compose a portable terminal in accordance with the illustrative embodiment of the present invention. Following this, various physical implementations of some these components, and their mechanical and functional interrelationships with other parts of the portable terminal, are described.

Figure 1:
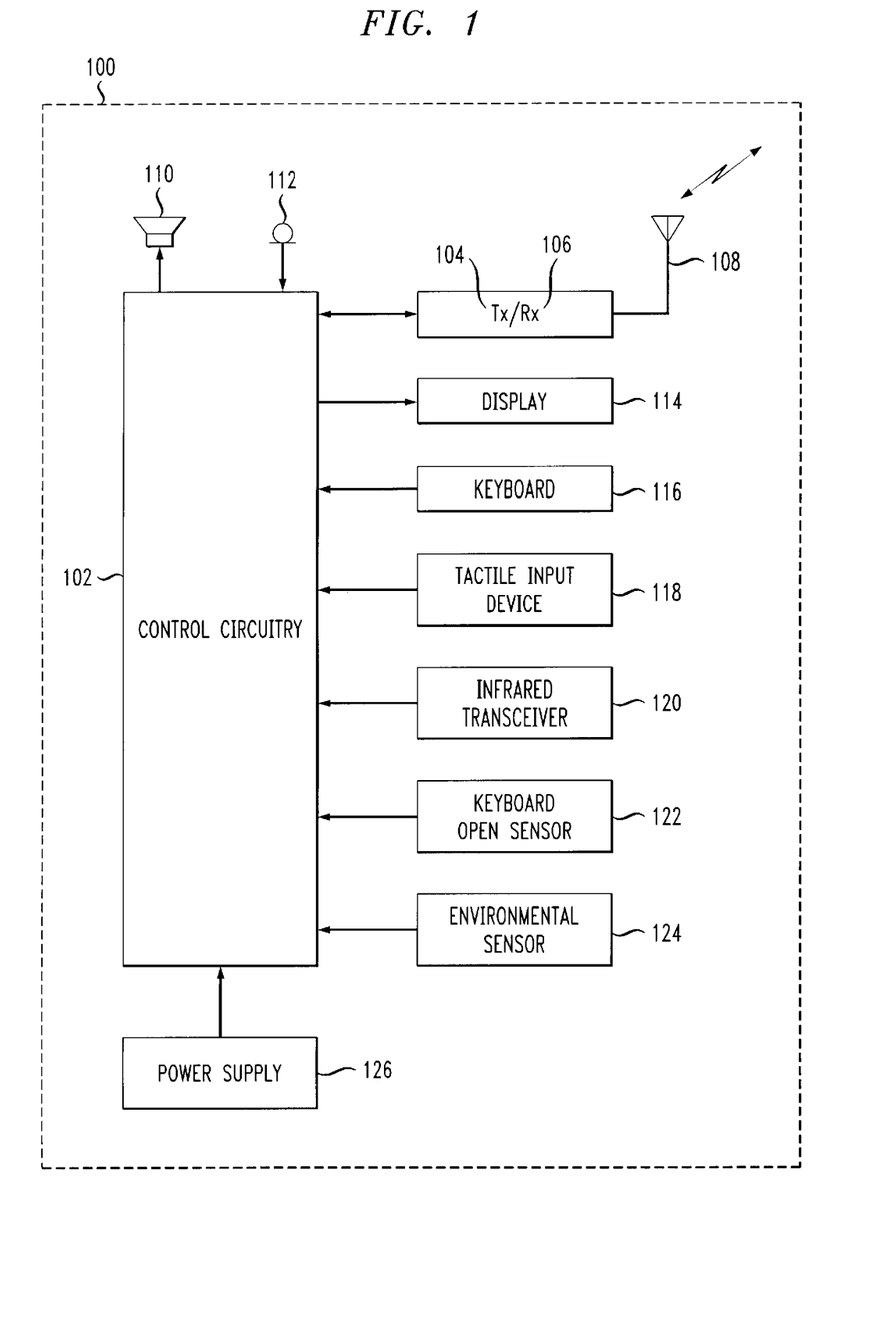
FIG. 1 depicts a block diagram of the salient components of a portable terminal in accordance with the illustrative embodiment of the present invention.

FIG. 1 is a high-level block diagram of portable terminal 100 in accordance with the illustrative embodiment of the present invention. Portable terminal 100 provides both wireless telecommunications capabilities and personal computing (i.e., PDA-type) capabilities.

With regard to its telecommunications capabilities, portable terminal 100 is capable of transmitting and receiving both voice and data with wireless base stations (not shown) or other wireless terminals, or both. Additionally, portable terminal 100 is capable of supporting telecommunications with wireline terminals through a wireless base station and wireline infrastructure. As to its personal computing capabilities, portable terminal 100 provides typical PDA computing and storage capabilities, including, without limitation, scheduling, address book storage and retrieval, note-taking, and an ability to run a variety of application software packages (e.g., calculators, games, etc.).

Portable terminal 100 advantageously includes: control circuitry 102, transmitter 104, receiver 106, antenna 108, speaker 110, microphone 112, display screen 114, keyboard 116, additional tactile input devices 118, infrared transceiver 120, keyboard-open sensor 122, environmental sensor(s) 124 and power supply 126.

Control circuitry 102 is advantageously capable of coordinating and controlling the other components of portable terminal 100 to provide, as appropriate, wireless telecommunications capability and personal computing capability, in known fashion. Control circuitry 102 typically includes a processor, memory, and electrical interconnections, among other hardware. In some variations of the illustrative embodiment, a single processor is used for carrying out and controlling PDA operations and wireless telecommunications operations. In some other variations, separate processors are used for PDA operations and wireless telecommunications operations.

It will be understood that as used herein, the term "processor" equivalently means a single integrated circuit ("IC"), or a plurality of ICs or other components that are connected, arranged or otherwise grouped together, such as microprocessors, digital signal processors, application-specific integrated circuits, associated memory (e.g., RAM, ROM, etc.) and other ICs and components. Control circuitry 102 can include programmed general-purpose hardware or special-purpose hardware, or both.

Transmitter 104 and receiver 106 provide wireless telecommunications capability to portable terminal 100 at radio frequencies. Embodiments of present invention can use any access technology (e.g., frequency-division multiple access, time-division multiple access, time-division duplex, code-division multiple access, etc.) and any modulation scheme (e.g., frequency shift keying, quadrature phase-shift keying, etc.) in accordance with any interface (e.g., IS-41, IS-54, IS-95, GSM, etc.). Furthermore, portable terminal 100 can transmit and receive at any frequency (e.g., 800 MHz, 1800 MHz, etc.). It will be clear to those skilled in the art how to make and use transmitter 104, receiver 106 and antenna 108.

Speaker 110 is capable of outputting an acoustic signal (e.g., the speech of another person, an alerting or ringing signal, etc.) to a user of portable terminal 100 in well-known fashion. Furthermore, control circuitry 102 is capable of adjusting the volume of the acoustic signal output from speaker 110.

Microphone 112 is capable of receiving an acoustic signal (e.g., the speech of the user of portable terminal 100, etc.), converting it to an electrical signal containing information that is indicative of the acoustic signal, and of conveying that information to control circuitry 102 for transmission via transmitter 104 in known fashion.

Display 114 is a visual display for outputting information (e.g., text, images, video, etc.) to a user of portable terminal 100. Display 114 includes a display screen, such as a liquid crystal display ("LCD"), and various electronics that, in conjunction with control circuitry 102, drives the display screen. Display 114 also typically includes a light source (not depicted) for illuminating the display screen. It will be clear to those skilled in the art how to make and use display screen 114.

Keyboard 116 is a tactile input device that includes a set of keys that enables portable terminal 100 to receive information from a user. The keys in keyboard 116 can be used to input a variety of different types of information to portable terminal 100. For example, the keys of keyboard 116 can be representative of, without limitation, alphabetic characters of an alphabet, numerals, mathematical operators, mathematical functions, specific commands that are useful in conjunction with certain types of application software (e.g., games, etc.), retail items (e.g., food and drink that is offered by a restaurant, specific types of inventory in a warehouse, etc.).

Keyboard 116 can include one or more keypads (i.e., regional groupings or grids of numerical and/or function keys arranged for efficient use). Advantageously, keyboard 116 is illuminated by a light source, under the control of control circuitry 102, to aid the user of portable terminal 100 to enter information into keypad 116. It will be clear to those skilled in the art how to make and use keyboard 116.

Additional tactile input devices 118 include keys or key-like elements (e.g., a joystick, etc.) that are not physically co-located with the group of keys that define keyboard 116. These additional keys enable user to deliver information to portable terminal 100. In some embodiments, the information provided by additional tactile input devices 118 is different than the information that can be provided via the keys in keyboard 116. For example, one additional tactile input device 118 is a pointing device that moves a cursor in display screen 114. A second additional tactile input device 118 is a scroll button that allows a user to scroll through menu selections that are presented in display screen 114. It will be clear to those skilled in the art how to make and use additional tactile input devices 118.

Infrared transceiver 120 is a device (e.g., an IrDA compliant device, etc.) that enables portable terminal 100 to communicate with other devices by modulating infrared light. It will be clear to those skilled in the art how to make and use infrared transceiver 120.

Keyboard-open sensor 122 is a device that senses when keyboard 116, which in some variations of the illustrative embodiment is rotatable between an open position and a closed position, is in the open position. A signal from the keyboard-open sensor is delivered to control circuitry 102. Keyboard-open sensor 122 can be implemented in any of variety ways known to those skilled in the art (e.g., as a mechanical sensor, as an optical sensor, etc.).

Environmental sensor(s) 124 are one or more devices that sense ambient environmental factors (e.g., temperature, vibration, noise, light, motion, etc.). Environmental sensor (s) 124 generate a signal that is responsive to the environmental factor, and the generated signal is received by control circuitry 102. The control circuitry then alters certain aspects of various components (e.g., the level of illumination that is provided to display screen 114 and/or keyboard 116, the volume of speaker 110, etc.).

It will be appreciated that the specific implementation of environmental sensor(s) 124 is a function of the environmental factor that is being sensed. For example, when environmental sensor 124 is required to sense ambient noise, environmental sensor 124 can be, for example, a microphone, such as microphone 112. When environmental sensor 124 is required to sense ambient light intensity, it can be, for example, a cadmium-sulfide photoresistor, a charge-coupled device, or other known light-sensitive device. It will be clear to those skilled in the art how to make and use environmental sensors 124.

Power supply 126 supplies electrical power to the components of portable terminal 100 that require power (e.g., processor(s), display screen 114, sensors 122 and/or 124, etc.). Power supply 126 is advantageously implemented with rechargeable or replaceable batteries. In some embodiments, at least two separate power supplies 126 are provided. One of the supplies, which is the primary power supply, has greater energy output and storage capacity and is used for powering portable terminal 100 during normal operations. The second supply is a back-up that is used, for example, to maintain data (e.g., address book information, scheduling information, etc.) in memory when the primary power supply is removed (e.g., for replacement, etc.).

Various physical implementations of the components that are described (functionally) above, and their mechanical and functional interrelationships with other parts of the portable terminal, are now described with reference to FIGS. 2 through 5. For the sake of clarity, the components that have been described in terms of their functionality (see FIG. 1), are provided with a "call-out" (i.e., numerical identifier) that is in the range 102 through 198. The illustrative physical implementations these components, some of which appear in FIGS. 2 through 6D, have been provided with a different call-out. The purpose for this is that, in some cases, a component, as functionally described, incorporates more elements (additionally circuitry, etc.) than is depicted in the illustrative physical implementations.

With reference to FIGS. 2 through 6D, portable terminal 100 includes display 228 and keyboard-housing 230. The keyboard-housing consists of base 338 and housing 340 (see, FIGS. 3 through 6D). Display 228 has a display screen 232, which is advantageously a LCD screen. For ease of viewing, it is desirable to provide a display screen 232 that is as large as possible. Display screen 232 is limited to some maximum size that is imposed by the size of display 228. In this regard, it is particularly advantageous to use a "flexible circuit" (e.g., chip-on-flex, etc.) for a portion of the circuitry that is required for the LCD display (e.g., the drive circuitry, etc.). In flexible circuits, circuitry is formed on a flexible polymer tape, etc., in well-known fashion. Typically, "chip-on-glass" technology is used wherein the LCD-drive circuitry, for example, is attached to a portion of the glass display. This renders that portion of the glass unusable for displaying information. On the other hand, the flexible circuit is simply attached to the glass display at an end thereof such that is does not use a significant amount of glass "real estate." For example, with reference to FIG. 2, the flexible circuit (not shown) can be located in the arcuate region of display 228 that is situated below display screen 232. Consequently, the use of a flexible circuit for the display screen 232 increases its usable size.

Figure 2:
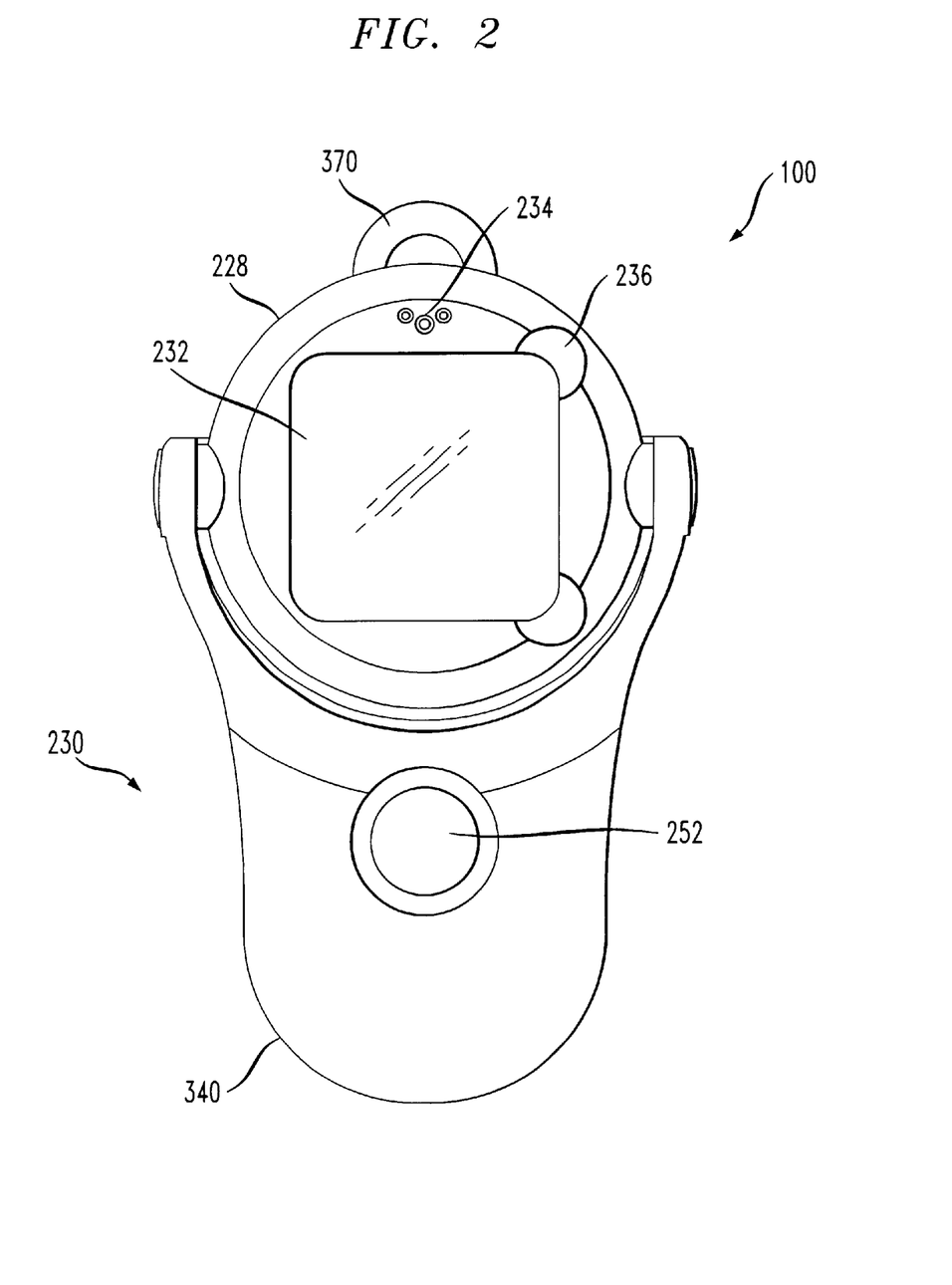
FIG. 2 depicts a plan view of a PDA/wireless terminal in accordance with the illustrative embodiment of the present invention.

In the variation of portable terminal 100 that is depicted in the Figures, display 228 also includes openings 234 and convenience keys 236. Sound from an underlying speaker (not shown) is outputted to a user through openings 234. Additionally, openings 234 pass verbal communications from a user to an underlying microphone (not shown), for transmission (e.g., to another wireless terminal, etc.) by the wireless telecommunications capabilities of portable terminal 100. Convenience keys 236 are advantageously soft (i.e., redefinable) keys for performing any one of a variety of functions (e.g., navigation, pointing, etc.). While in the illustrative embodiment two convenience keys 236 are depicted, in some other variations, more or less convenience keys 236 are present.

Figure 3:
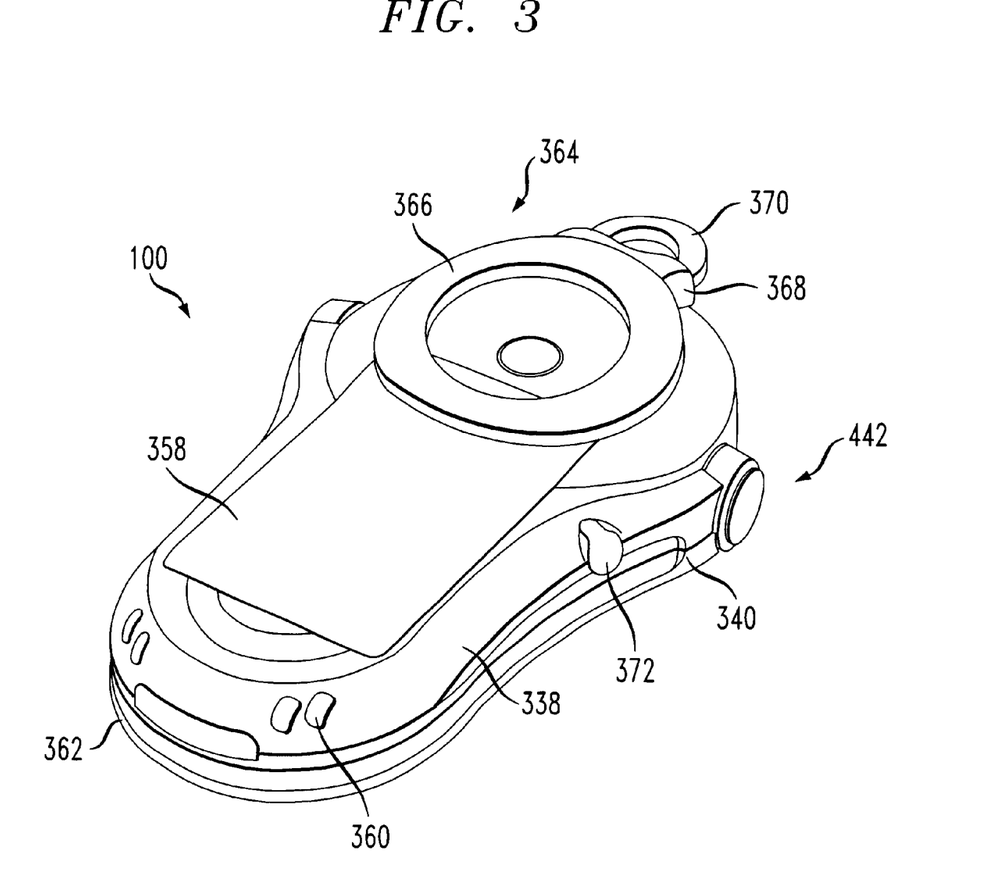
FIG. 3 depicts a perspective view of the back of the PDA/wireless terminal shown in FIG. 2.
Figure 4:
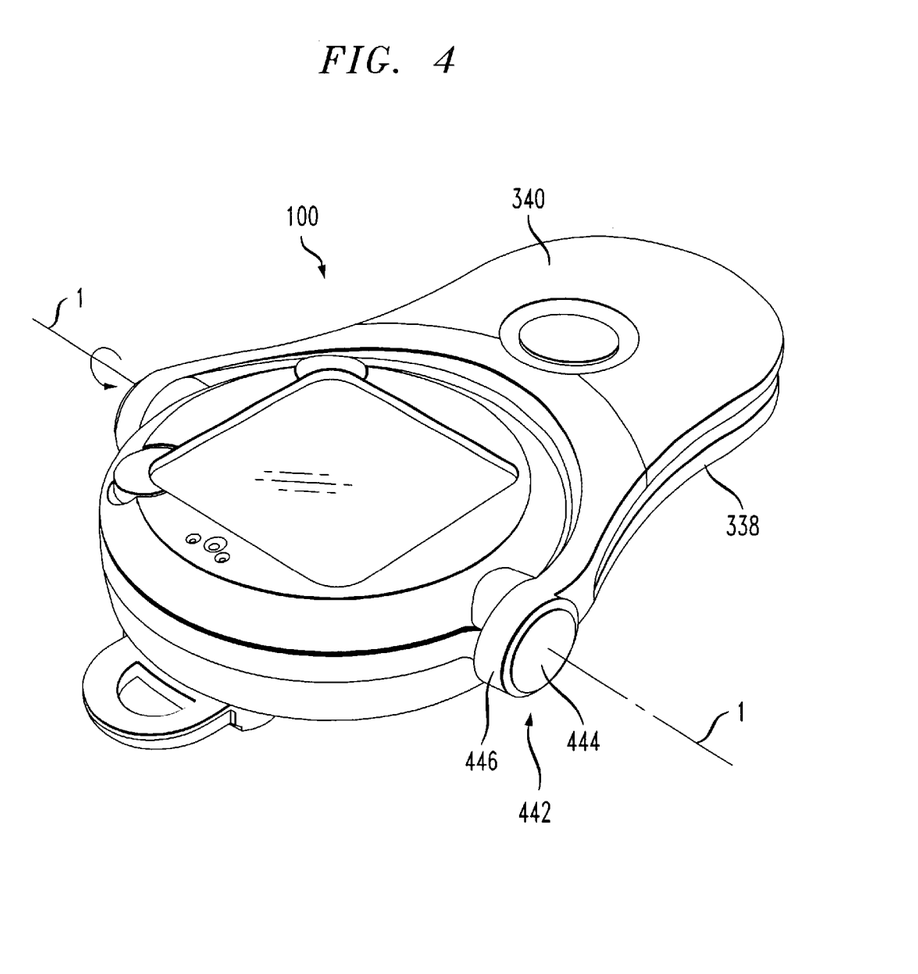
FIG. 4 depicts a perspective view of the front of the PDA/wireless terminal shown in FIG. 2.

In the illustrative embodiment, the back of base 338 provides access, via removable section 358, to batteries that power portable terminal 100 (see, FIG. 3). Also accessible via the back of base 338 are battery-charging contacts 360 and infrared port 362. Plug 372, which is accessible from the back or side of portable terminal 100, covers a headphone jack (not shown).

Portable terminal 100 also includes attachment device 364, which is disposed at the back of display 228. In the illustrative embodiment, attachment device 364 includes clip 366, spring-biasing element 368 and receiver 370. Spring-biasing element 368 biases clip 366 against the back surface of display 228. Clip 366 and spring-biasing element 368 function, collectively, to enable portable terminal 100 to be clipped, for example, to an article of clothing (e.g., belt, waistband of trousers, a pocket, etc.). Receiver 370 is used to hang portable terminal 100 from, for example, a user's neck. In particular, cord, etc. is passed through receiver 370 and then securely looped. The loop is then placed over a user's head so that portable terminal 100 hangs in the manner of a charm from a necklace against a user's chest.

In the illustrative embodiment depicted in FIG. 3, clip 366 has a circular shape and receiver 370 has a semi-circular shape. It will be appreciated that the shape of these elements provides no particular function. In fact, in some variations of the illustrative embodiment, clip 366 and receiver 370 have a different shape (e.g., rectangular, etc.) to provide a different look to portable terminal 100.

Figure 5:
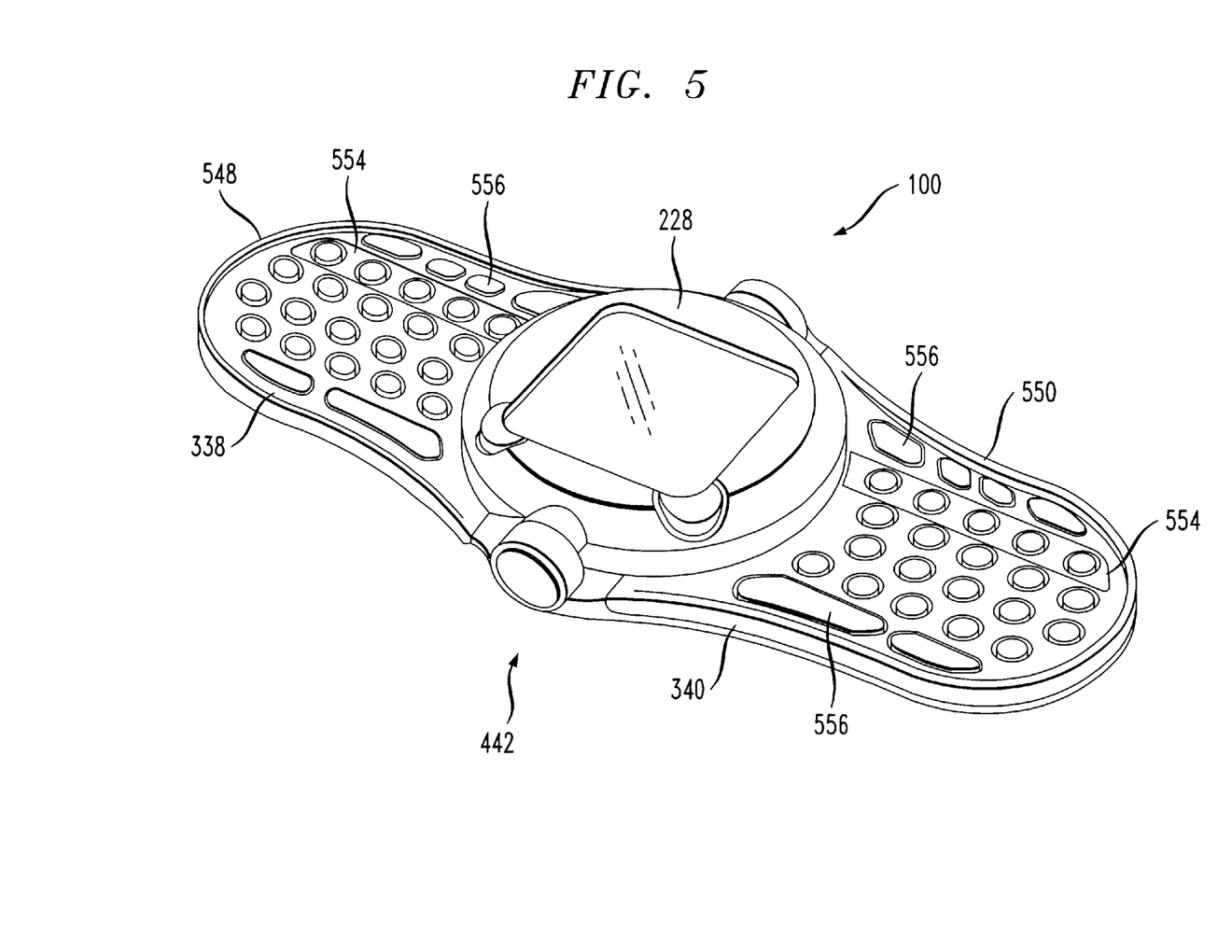
FIG. 5 depicts the PDA/wireless terminal of FIGS. 2–4 in an open position wherein its keyboard is accessible.
Figure 6A:
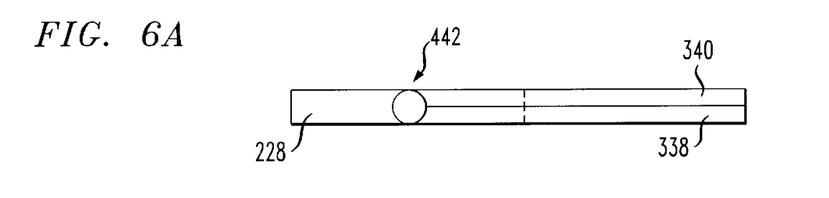
FIGS. 6A–6D depicts the housing of a PDA/wireless terminal in accordance with the illustrative embodiment being rotated from a fully closed position to a fully open position.
Figure 6B:
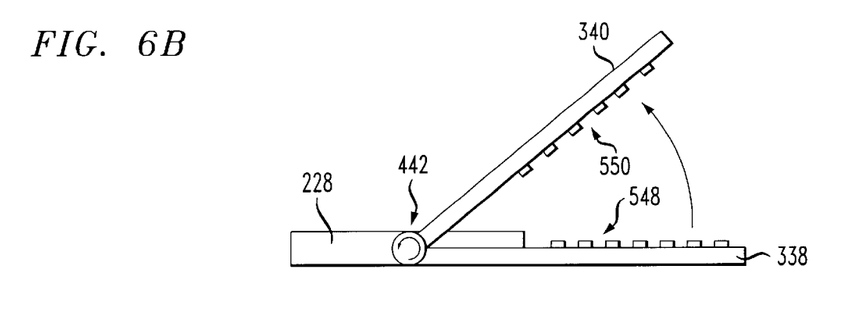
Figure 6C:
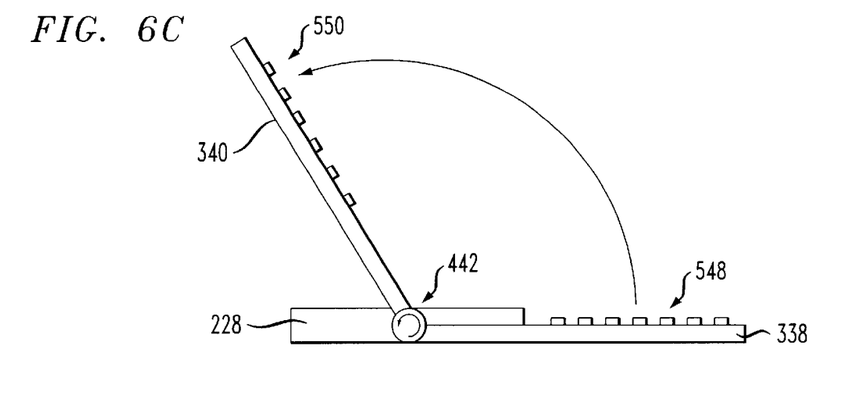
Figure 6D:
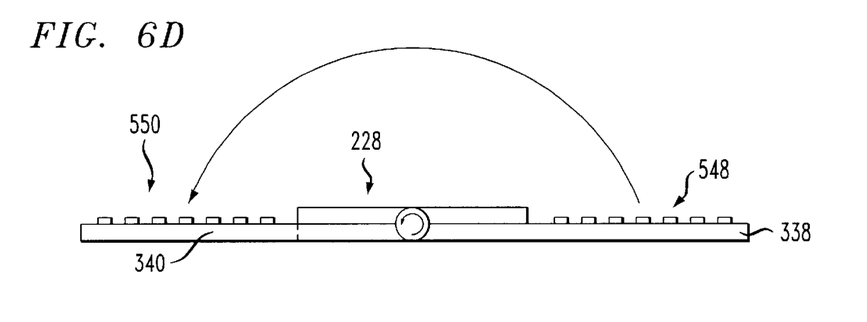

In accordance with the illustrative embodiment of the present invention, portable terminal 100 can be used in either of two basic configurations: "closed," as depicted in FIGS. 2 through 4 and 6A, or "open," as depicted in FIGS. 5 and 6D. As described in further detail below, when portable terminal 100 is closed, it is used in the manner of a conventional wireless terminal to send and receive calls. When open, both the telecommunications capabilities and the PDA capabilities of portable terminal 100 are accessible. To support this, all of display 228 is visible to a user either when portable terminal 100 is closed or open.

As is perhaps most clearly seen in FIG. 3, display 228 and base 338 are, in the illustrative embodiment, unified as a single, non-separable part. Housing 340 is rotatably connected to base 338 (and display 228) at pivot 442 (see, e.g., FIG. 4). By virtue of pivot 442, housing 340 is capable of rotating "out-of-plane" (of base 338) about pivot axis 1—1 (see, FIG. 4) between a fully closed position (see, FIGS. 2 through 4) and a fully-open position (see, FIG. 5). (See, also, FIGS. 6A through 6D). Pivot axis 1—1 bisects display 228. In the illustrative embodiment, pivot 442 is implemented as rod 444, and cooperating receiver 446 that depends from housing 340. As will become clear from disclosure that is provided later in this specification, it is important that housing 340 rotate "out-of-plane" since this type of rotation exposes the underside of housing 340.

So, when portable terminal 100 is closed (see, e.g., FIGS. 2–4 and 6A) housing 340 is superposed over base 338 so that the two housings coincide and serve as a handle for gripping the portable terminal 100 in the manner of a conventional wireless phone. Additionally, in this state, base 338 and housing 340 serve as a cover for the keyboard.

When portable terminal 100 is in a closed position (see, e.g., FIGS. 2 through 4 and 6A), it can be used to make and receives telephone calls. A button or other type of tactile input device 252 can be used to receive a telephone call. That is, when portable terminal 100 "rings" to alert a user of an incoming call, the user simply depresses button 252 to accept the call.

To place a call when portable terminal 100 is closed, convenience keys 236 are used to access a phone book and select a number from the phone book (e.g., by scrolling, etc.). In some variations of the illustrative embodiment, convenience keys 236 are used to enter a telephone number from a "virtual" keypad that appears in display screen 232. In these variations, it is advantageous to provide additional convenience keys 236 (e.g., two more) to keep the number of keystrokes that are required for entering a telephone number acceptably low. Those skilled in the art will know how to implement this capability.

To access various PDA-type applications (e.g., address book, schedule, etc.) of portable terminal 100 and enter alphanumeric data to send, for example, a data message, portable terminal 100 is opened. As previously described, to open portable terminal 100, housing 340 is rotated out-of-plane away from base 338, as illustrated in FIGS. 6B and 6C.

Portable terminal 100 advantageously includes a latching mechanism (not shown) and, in some variations, a spring-biasing arrangement (not shown). In some implementations, the latching mechanism locks portable terminal 100 closed. When the latching mechanism is released, housing 340 "pops up" as a consequence of the spring-biasing arrangement (when included). The user then manually positions housing 340 as desired. In some alternate embodiments, the latching mechanism locks portable terminal 100 in an open position. When the latching mechanism is released, housing 340 is forced to base 338 due to the action of the spring-biasing mechanism (when included). The user than fully rotates housing 340 into contact with base 338, as desired, to close portable terminal 100. Those skilled in the art will know how to implement a latching mechanism to lock portable terminal 100 closed or open, and how to implement a spring-biasing arrangement.

In the illustrative embodiment, the keyboard is implemented in two portions, keyboard portion 548 and keyboard portion 550. Keyboard portion 548 is disposed within base 338 and keyboard portion 550 is disposed within housing 540. When portable terminal 100 is in the open position, display 228 is disposed between keyboard portion 548 and keyboard portion 550.

Keyboard portions 548 and 550 provide a set of keys for inputting the alpha characters of a language (e.g., English, etc.), a linearly-arranged keypad 554 for inputting numbers, and additional function keys 556 (e.g., keys that access certain applications, such as an address book, schedule, note taker, etc., or that provide an ability to scroll, etc.) Additionally, keyboard portions 548 and 550 advantageously include keys that access various telecommunications functions (i.e., the ability to place a call, the ability to receive a call, etc.). In the illustrative embodiment, each of the keyboard portions contains about one-half the total number of keys. In some variations of the illustrative embodiment, the keys are unequally distributed between the two keyboard portions.

In the illustrative embodiment, housing 340 is rotated 180 degrees out-of-plane to a "fully-open" position. It will be understood, however, that housing 340 need not be rotated a full 180 degrees to access and use the keyboard. In fact, a user might prefer to rotate housing 340 somewhat less than 180 degrees (e.g., 160 degrees rotation, etc.). In particular, some users might find that when base 338 and housing 340 are less than 180 degrees apart, less stress is placed on their wrists, especially during periods of extended use (e.g., game playing, etc.). Alternatively, in some variations of portable terminal 100, housing 340 is rotatable beyond 180 degrees, again for the comfort of the user.

Keys in keyboard portion 548 are advantageously offset or staggered relative to those in keyboard portion 550. This ensures that when the portable terminal 100 is closed, the keys from the opposed keyboard portions do not contact one another.

It will be appreciated that some of the functions of portable terminal 100 cannot be used until it is opened (e.g., personal computing capabilities, text messaging, etc.) Consequently, in some variations, power is not provided to at least some of the circuitry/components that are not used until portable terminal 100 is open (e.g., keyboard portions 548 and 550, etc.). Upon a signal from keyboard open sensor 122 that portable terminal 100 is open, control circuitry 102 powers the appropriate circuitry/components.

It is to be understood that the above-described embodiments are merely illustrative of the present invention and that many variations of the above-described embodiments can be devised by those skilled in the art without departing from the scope of the invention. It is therefore intended that such variations be included within the scope of the following claims and their equivalents.

We claim:

1. A portable terminal comprising:
    a base;
    a display coupled to the base, wherein said display has a display screen; and
    a housing that is rotatably coupled to at least one of either said display or said base;
    wherein said housing is rotatable out-of-plane between a first position and a second position;
    wherein in said first position, said housing overlies said base such that said portable terminal is closed;
    wherein in said second position, said housing and said base flank said display such that said portable terminal is open; and
    wherein said display screen is fully visible to a user when said portable terminal is open and when said portable terminal is closed.

2. The portable terminal of claim 1:
    wherein said base has an inner surface;
    wherein said housing has an inner surface;
    wherein said inner surfaces oppose one another when said portable terminal is closed; and
    wherein said portable terminal further comprises:
        a first group of keys that are disposed on said inner surface of said base; and
        a second group of keys that are disposed on said inner surface of said housing.

3. The portable terminal of claim 2 wherein said first group of keys and said second group of keys collectively comprise an alphabetic keyboard.

4. The portable terminal of claim 3 wherein at least one of said first group of keys and said second group of keys comprises a numeric keypad.

5. The portable terminal of claim 3 wherein said portable terminal comprises a wireless-telecommunications capability and a personal-computing capability.

6. The portable terminal of claim 3 further comprising a keyboard-open sensor and control circuitry, and wherein:
    said keyboard open sensor generates a signal when said portable terminal is open; and
    responsive to said signal, said control circuitry powers said keyboard.

7. The portable terminal of claim 2 wherein said first group of keys is offset relative to said second group of keys so that when said portable terminal is closed, said first group of keys does not abut said second group of keys.

8. The portable terminal of claim 5 wherein said wireless-telecommunications capability is accessible to a user of said portable terminal when said portable terminal is open and when said portable terminal is closed.

9. The portable terminal of claim 1 wherein said display is round.

10. The portable terminal of claim 1 further comprising a latching mechanism that engages said housing, and wherein said latching mechanism provides at least one of the following functions:
    secures said housing against said base when said portable terminal is closed; and
    prevents said housing from rotating toward said base when said portable terminal is open.

11. The portable terminal of claim 10 further comprising a spring-biasing arrangement, wherein said spring-biasing arrangement biases said housing away from said base.

12. The portable terminal of claim 10 further comprising a spring-biasing arrangement, wherein said spring-biasing arrangement biases said housing toward said base.

* * * * *